Nov. 17, 1970   M. L. GREENBERG   3,540,319
BORING METHOD AND APPARATUS
Filed Jan. 9, 1969   6 Sheets-Sheet 3
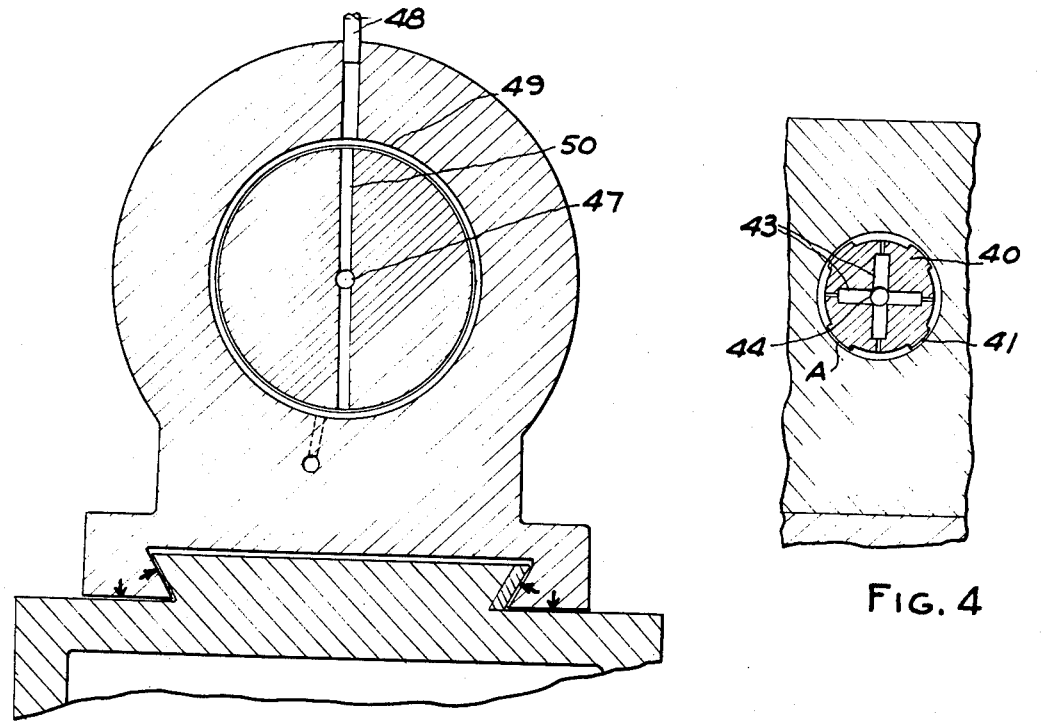
FIG. 3
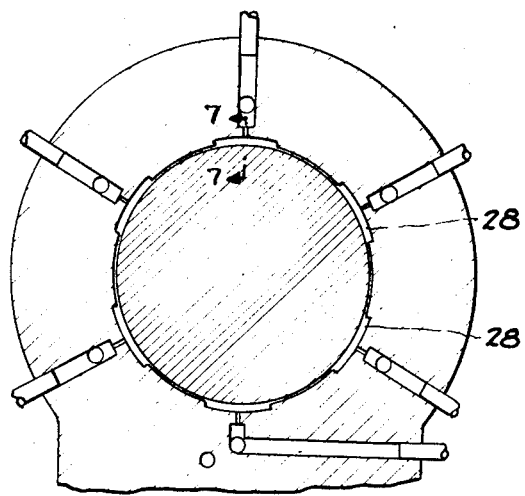
FIG. 5
FIG. 4
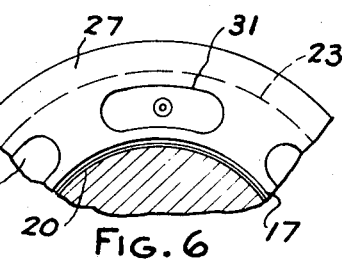
FIG. 6
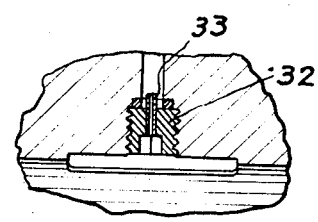
FIG. 7
INVENTOR.
MYRON L. GREENBERG
BY
Barnes, Kisselle, Raisch & Choate
ATTORNEYS Nov. 17, 1970     M. L. GREENBERG     3,540,319
BORING METHOD AND APPARATUS
Filed Jan. 9, 1969                    6 Sheets-Sheet 4
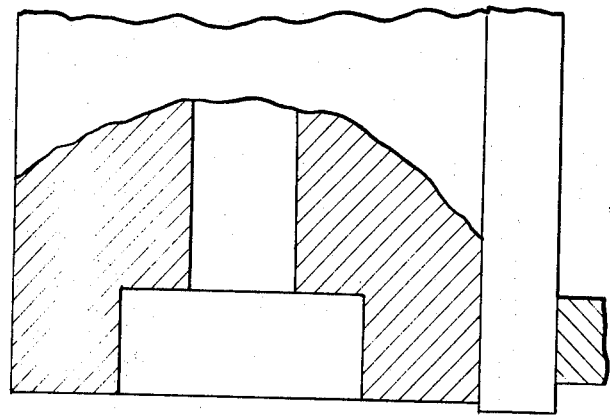
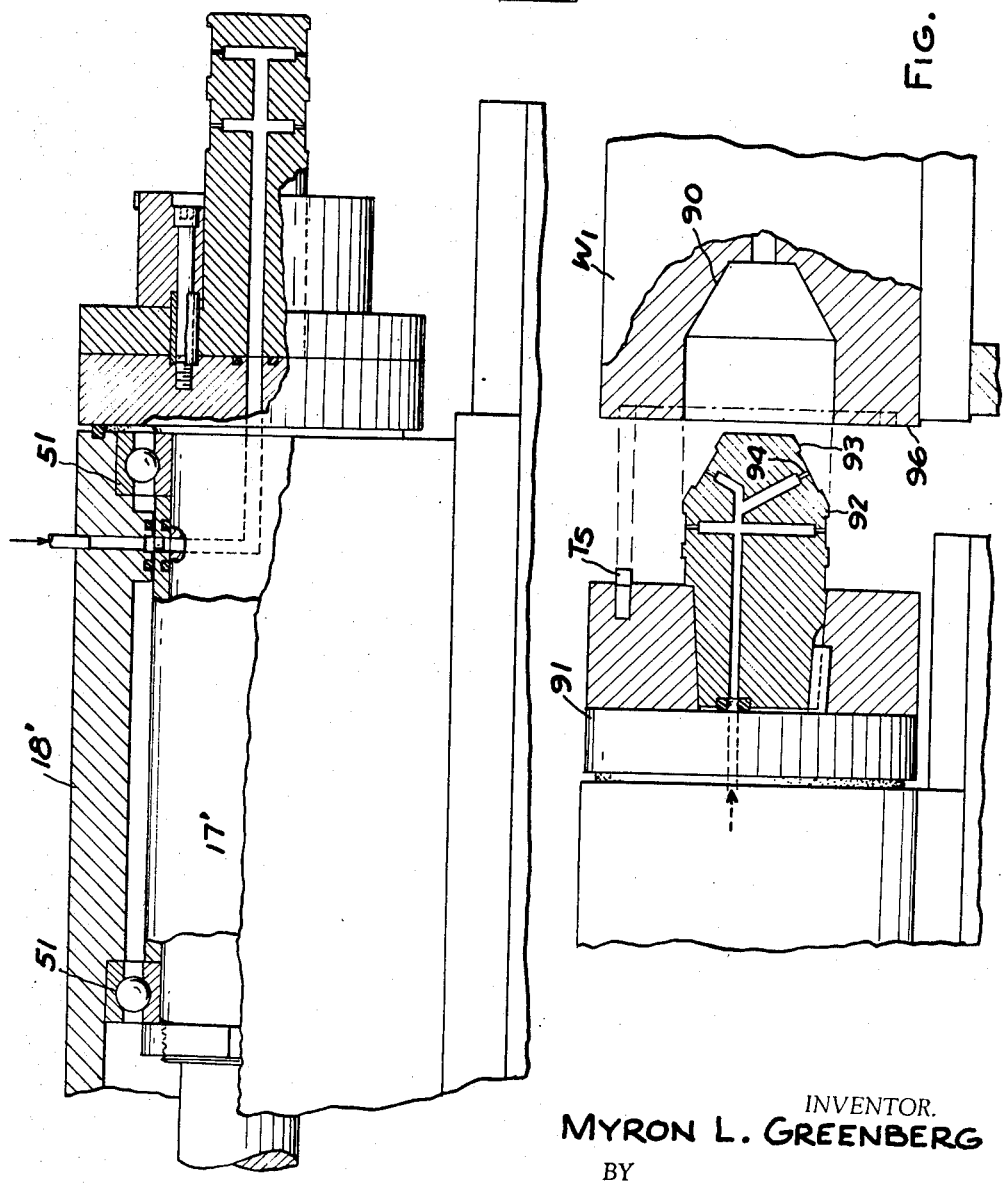
INVENTOR.
MYRON L. GREENBERG
BY
Barnes, Kisselle, Raisch & Choate
ATTORNEYS

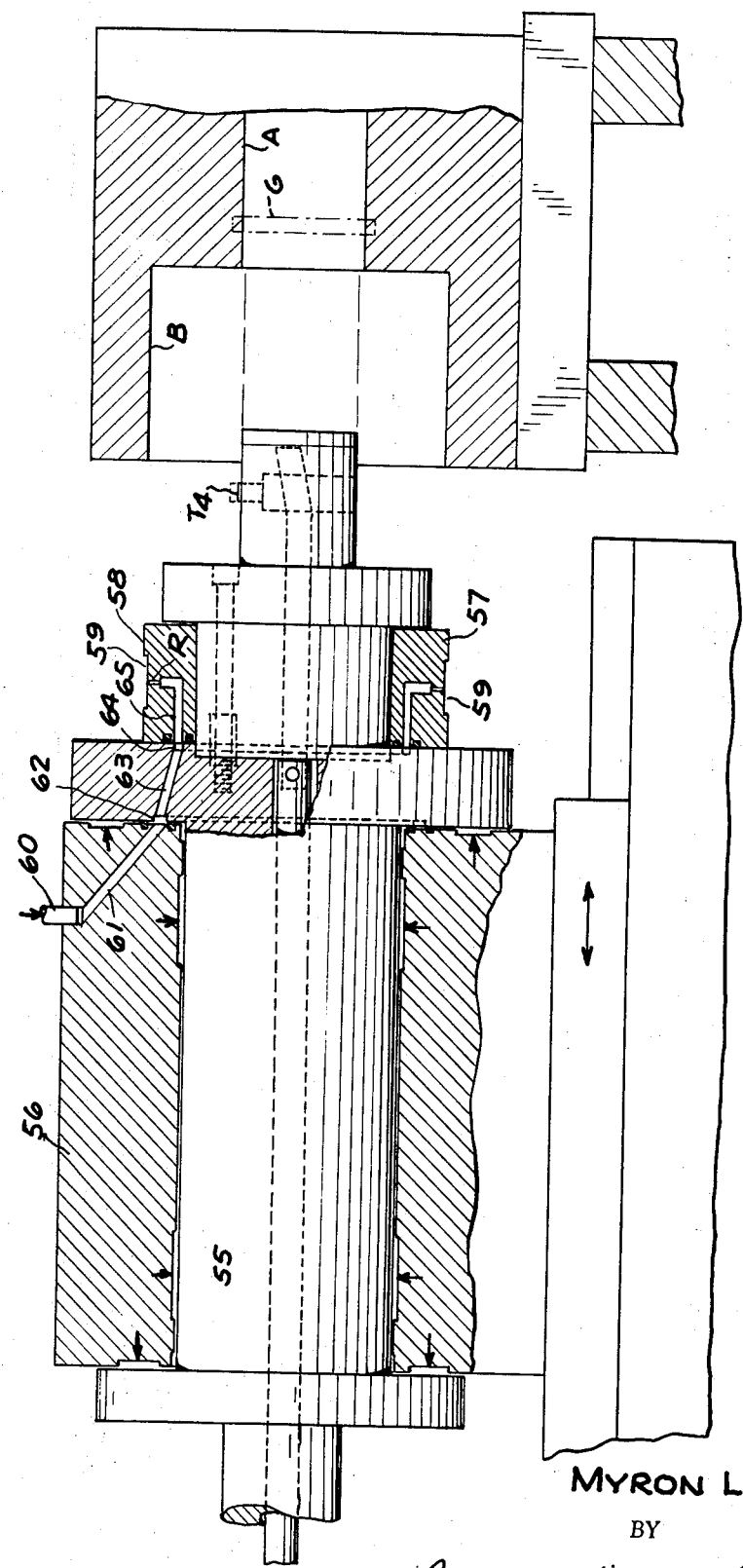

INVENTOR.
MYRON L. GREENBERG
BY
Barnes, Kisselle, Raisch & Choate
ATTORNEYS

United States Patent Office 3,540,319
Patented Nov. 17, 1970

3,540,319
BORING METHOD AND APPARATUS
Myron L. Greenberg, Union Lake, Mich., assignor to The Babcock & Wilcox Company, New York, N.Y., a corporation of New Jersey
Filed Jan. 9, 1969, Ser. No. 791,210
Int. Cl. B23b 39/00
U.S. Cl. 77—1                                21 Claims

ABSTRACT OF THE DISCLOSURE

A boring method and apparatus wherein a workpiece having roughly formed concentric bores is moved to successive stations. At a first station, one of the bores is finished. At a second station, a combined tool support and locator is moved into position to finish the second bore. The locator has circumferentially spaced pressure pads and associated restrictors thereon and fluid is supplied to each restrictor so that fluid flows between the locator and the first bore to accurately locate the tool support with respect to the workpiece.

---

This invention relates to boring and particularly to finish boring of concentric bores.

One of the problems with respect to finish boring of concentric bores is that of maintaining concentricity between the concentric bores.

Among the objects of the invention are to provide a novel method and apparatus for finishing concentrically formed bores or openings in a workpiece; to provide a method and apparatus whereby the accuracy of concentricity can be maintained within very accurate limits; to provide a method and apparatus wherein additional functions or work operations can be performed on the concentric bores; and to provide a method and apparatus for accurately gauging the concentric bores after they are formed.

In the drawings:

FIG. 3 is a fragmentary sectional view taken along the line 3—3 in FIG. 2.

FIG. 4 is a fragmentary sectional view taken along the line 4—4 in FIG. 2.

FIG. 5 is a fragmentary sectional view taken along the line 5—5 in FIG. 2.

FIG. 6 is a fragmentary sectional view taken along the line 6—6 in FIG. 2.

FIG. 7 is a fragmentary sectional view on an enlarged scale taken along the line 7—7 in FIG. 5.

FIG. 8 is a fragmentary sectional view of a modified form of apparatus.

FIG. 9 is a fragmentary sectional view of a further modified form of apparatus.

FIG. 11 is a part sectional view of a further modified form of apparatus.

Figure 1:
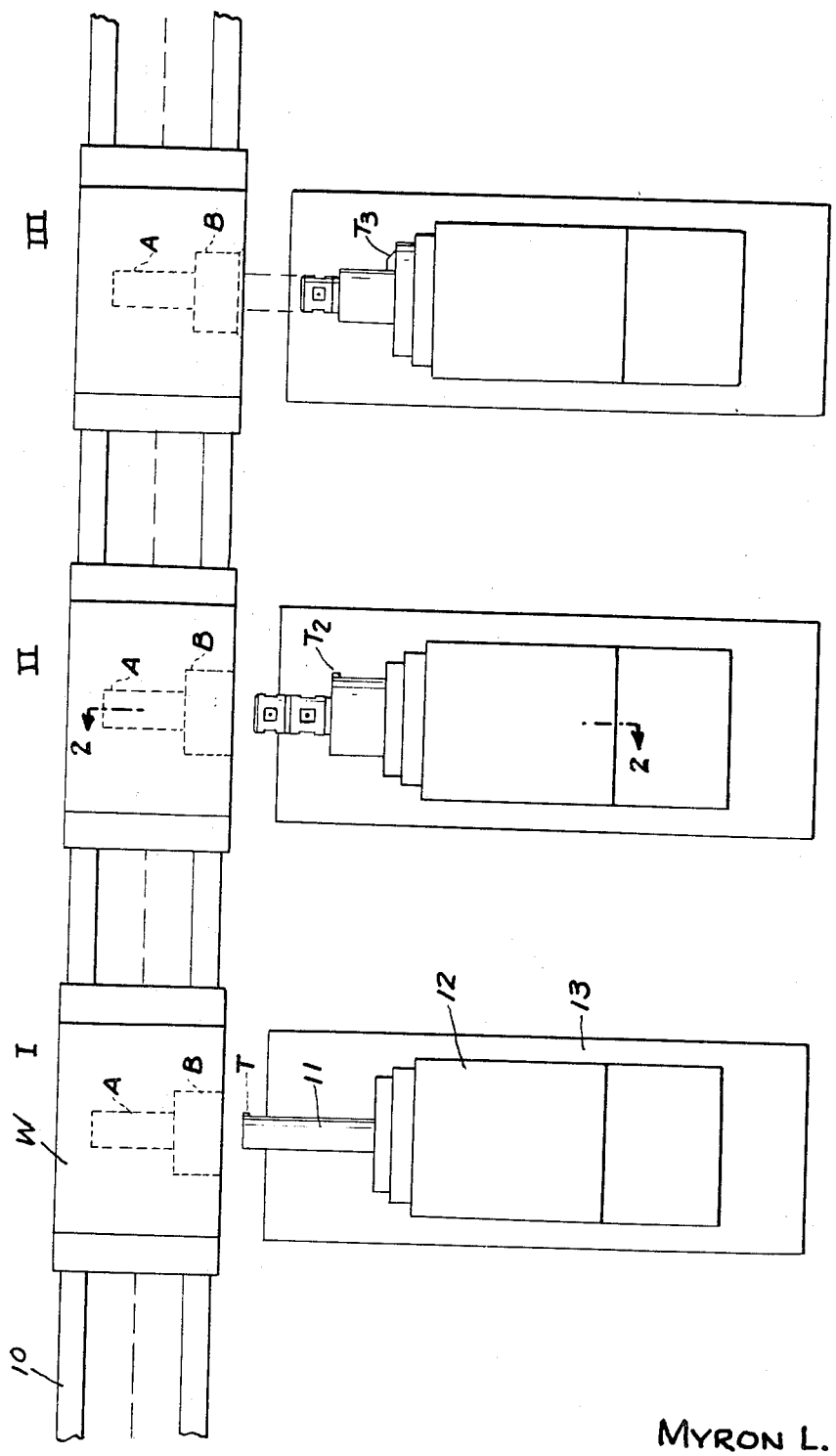
FIG. 1 is a partly diagrammatic plan view of an apparatus embodying the invention.

Referring to FIG. 1, a workpiece W having roughly formed concentric bores A and B is adapted to be moved through successive stations by a transfer apparatus 10 of conventional construction. At the first station I, a tool T is brought into position for finish boring the first bore A. At a second station II, a tool $T_2$ is brought into position for finish boring the second bore B. At a third station III, a third tool $T_3$ is brought into position for chamfering the second bore B. At successive stations, not shown in FIG. 1, the workpiece has further work operations performed thereon and is gauged, as presently described.

Referring more specifically to FIG. 1, at the first station I, a tool support 11 supporting the tool T is mounted on a head 12 for rotation. The head 12 is, in turn, mounted upon a slide 13 for movement toward and away from the workpiece. The construction of the boring apparatus at this first station may be of conventional construction.

Figure 2:
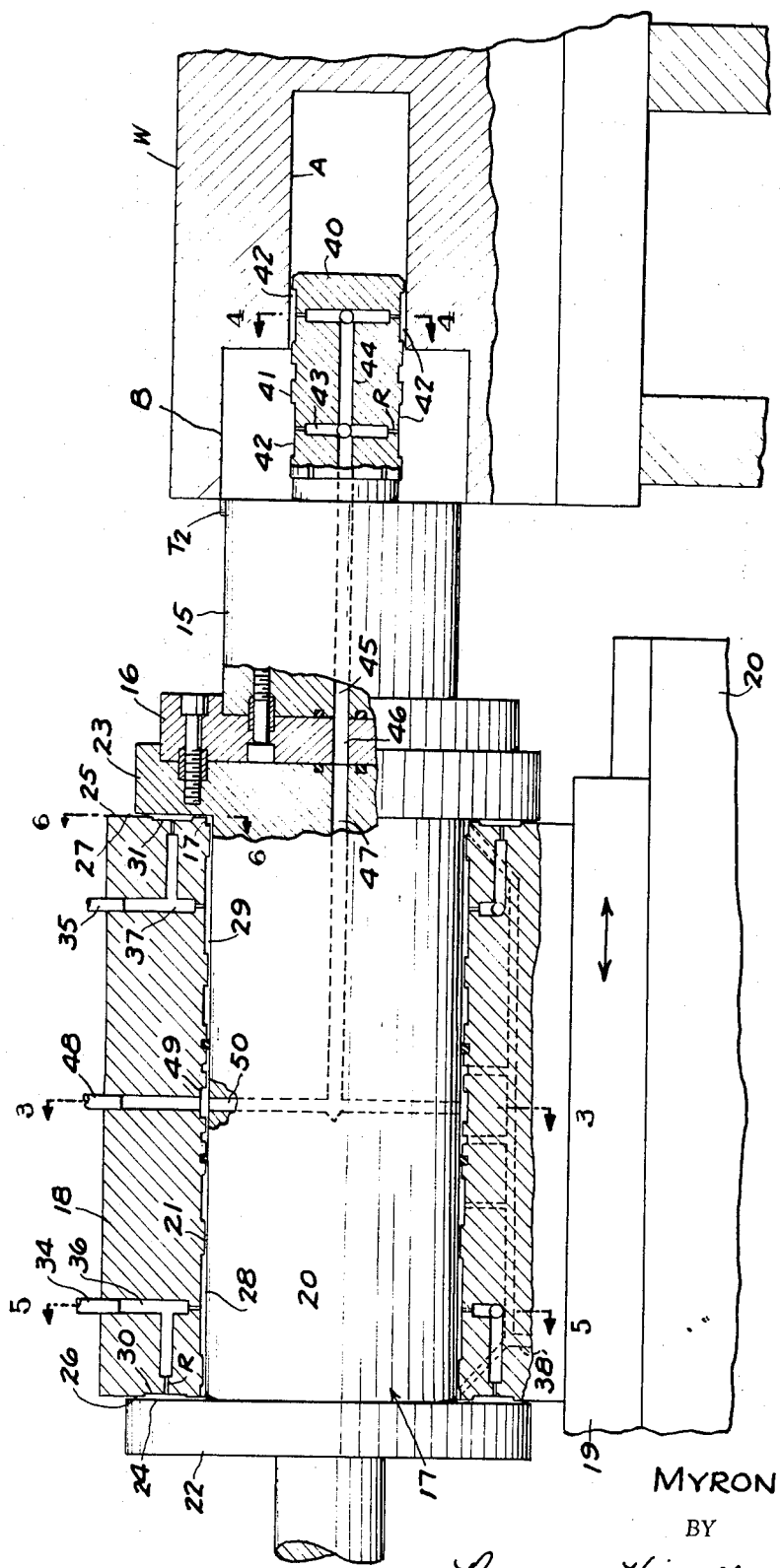
FIG. 2 is a part sectional view on an enlarged scale taken along the line 2—2 in FIG. 1 showing the parts in a different operative position.

Referring to FIGS. 1 and 2, the construction of the boring apparatus at the second station II includes a tool support 15 mounted by a bracket 16 on a spindle 17 which is rotatably supported in a housing 18 that, in turn, is fixed on a slide 19 movable along a base 20 by a cylinder or other mechanism.

The spindle 17 and housing 18 have complementary axial and radial surfaces. Specifically, the spindle 17 has a cylindrical surface 20 and the housing has a complementary cylindrical surface 21. The spindle further includes flanges 22, 23 that have radial surfaces 24, 25. The housing has complementary radial surfaces 26, 27.

The bore 21 of the housing is formed with longitudinally spaced sets of circumferentially spaced pressure pads or recesses 28, 29 (FIGS. 2, 5) and the radial surfaces 26, 27 have circumferentially spaced pads or recesses 30, 31 therein (FIGS. 2, 5). Each recess has a restrictor R associated therewith which may be of the type shown in FIG. 7, namely, a screw fitment 32 having a capillary tube 33 therein threaded into the base of each pressure pad.

Fluid under pressure is supplied to each pressure pad through appropriate passages. Thus, as shown in FIG. 2, fluid flows through an inlet 34 to the pads 28, 30 and through an inlet to the pads 29, 31 through annular headers 36, 37. The fluid flows outwardly from the pads between the complementary surfaces of the spindle and housing to annular drain openings generally designated 38 and shown in broken lines in FIG. 2.

Referring to FIGS. 2 and 4, the tool support 15 has a cylindrical locator 40 thereon that extends axially outwardly and has a cylindrical surface 41 thereon generally complementary to the surface of the previously finished bore A. Two longitudinally spaced sets of circumferentially spaced pressure pads 42 and associated restrictors R are provided in the surface 41. Fluid under pressure is supplied to the pads 42 through radial passages 43 which communicate with an axial passage 44 in locator 40, axial passage 45 in tool support 15, axial passage 46 in bracket 16 and axial passage 47 in spindle 17. The fluid is supplied to the axial pasage 47 through an inlet 48 to an annular passage 49 and radial pasage 50 (FIGS. 2, 3).

By this arrangement, fluid can flow under pressure to the pads 42 between the surfaces of the bore A as the tool support is moved toward the workpiece to maintain the surfaces 41 and the surface A of the bore in accurate spaced relation thereby locating the tool T with respect to the bore B so that the tool can finish the bore B in concentric accurate relationship to the bore A.

As shown in FIG. 3, wherein the pressure pads and associated restrictors are represented by arrows, the surfaces of the slide and base can be provided with longitudinally pressure pads and associated restrictors so that a film of fluid will flow therebetween to support the slide in accurate spaced relation to the base.

In the modified form of the invention shown in FIG. 8, the spindle 17' is rotatably supported in the housing 18' by ball bearings 51 rather than the manner previously described.

In the form of boring apparatus shown in FIG. 9, an apparatus is shown which can be utilized for performing a further work function on the workpiece at a successive station. Specifically, the spindle 55 is rotatably supported in the housing 56 by pressure pads and associated restrictors in the same manner as shown in FIG. 2, the pressure pads and restrictors being designated by arrows for purposes of convenience. In this form of boring apparatus, the tool $T_4$ is radially movable to form a groove G in the first bore A. A locator ring 57 having a cylindrical surface 58 complementary to the surface of the bore B is provided with circumferentially spaced pressure pads or recesses 59 and associated restrictors R. Fluid is supplied to the pressure pads 59 through an inlet 60, passage 61 to an annular groove 62, passage 63 to an annular groove 64 and, in turn, through axial passages 65 to the pressure pads.

In this form, as the tool support is moved axially into the workpiece, the locator 58 is positioned adjacent the bore B and fluid is caused to flow under pressure between the surface 58 of the locator and the surface of the bore B to accurately locate the tool $T_4$ which can then be moved radially outwardly in a conventional manner by mechanical linkage to form the groove G in accurate relation and concentricity.

Figure 10:
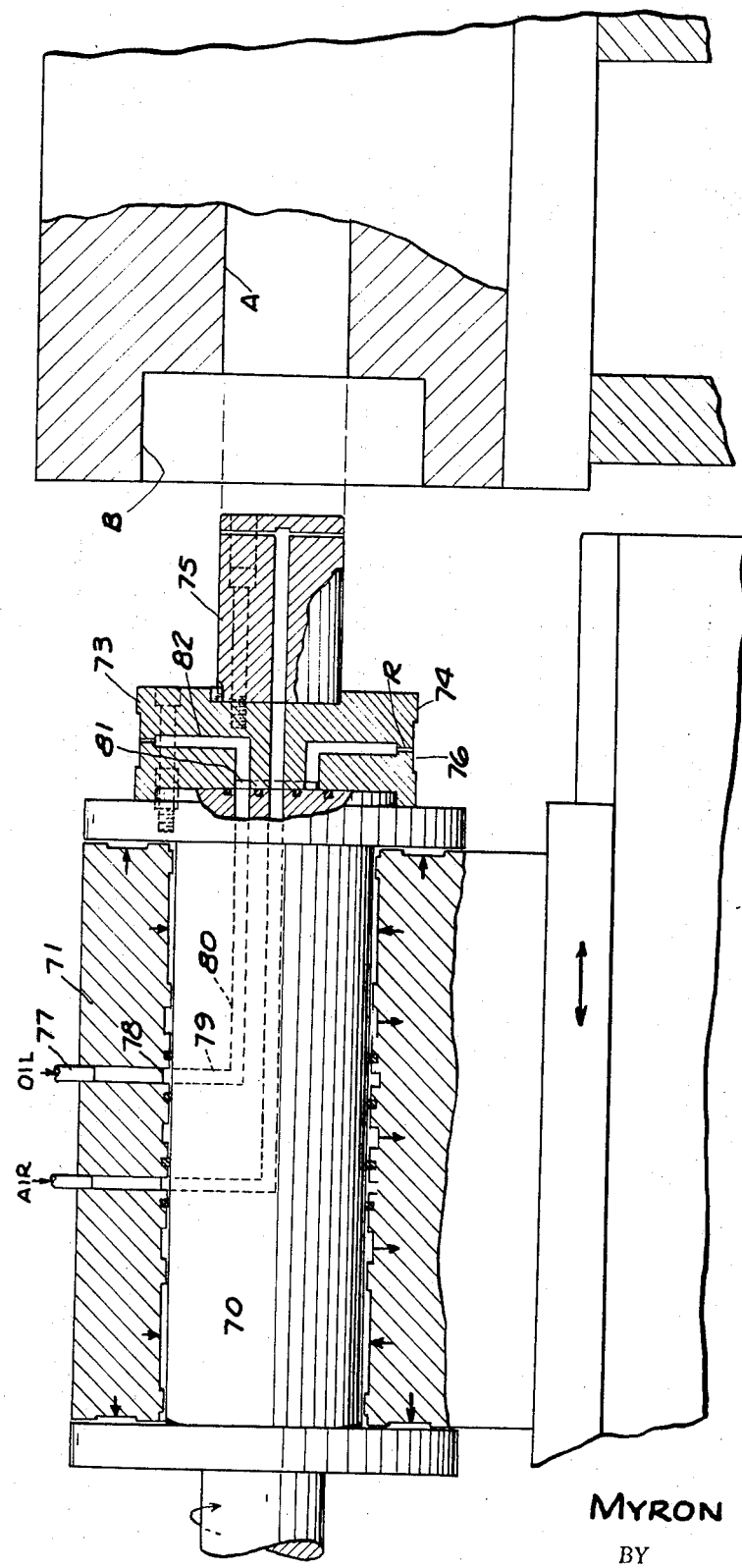
FIG. 10 is a fragmentary sectional view of a form of gauging apparatus utilized in the invention.

At a further station, the workpiece can be gauged by an apparatus such as shown in FIG. 10 wherein the spindle 70 is rotatably supported in the housing 71 in the same manner as the spindle shown in the FIG. 2 and has a locator 73 fixed thereto with a surface 74 complementary to one of the bores such as bore B. A gauge head 75, such as an air gauge is provided for gauging the other bore A. The surface 74 is formed with circumferentially spaced pressure pads 76 and associated restrictors R to which fluid is supplied through an inlet 77 in the housing to an annular groove 78 and radial passage 79, axial passage 80 to a groove 81 and passages 82. When the fluid is supplied to the pressure pads 76, fluid flows in a thin film between the surface 74 and the surface of the bore B to accurately locate the head 75 with respect to the bore A.

In the form of the invention shown in FIG. 11, an apparatus is shown for performing a facing or grooving function on a workpiece $W_1$. The workpiece has a previously formed conical locating surface 90. The facing or grooving head 91 is rotatably mounted by pressure pads in the same manner as the spindle shown in FIG. 2 and has a locator 92 thereon with a conical surface 93 having pressure pads 94 and associated restrictors therein. When the head 91 is moved into position, the locator 92 is brought with its surface 93 adjacent the surface 90. When fluid under pressure is supplied to the pressure pads 94, a thin film flows therebetween to accurately locate the locator 92 and, in turn, the head 91 relative to the workpiece $W_1$. This, in turn, locates the tool $T_5$ for performing an operation on the surface 96 of the workpiece. Tool $T_5$ may be moved in some predetermined path as in any conventional facing and grooving head.

I claim:
1. The method which comprises the step of:
   moving a workpiece having axially spaced concentric rough bores through successive stations,
   finish boring the axially innermost of said pair of bores at a first station,
   moving a tool support having a locator therein and a tool thereon for finishing the other of said bores into said workpiece at a second station,
   providing fluid under pressure between the surfaces of the locator and the first bore at said second station to locate said tool support while said tool is operated on said second bore at said second station.
2. The method set forth in claim 1 including the step of moving said workpiece to a third station,
   moving a tool support having a locator and another tool into said workpiece,
   causing fluid to flow between the surfaces of said locator and said first bore at said third station while said other tool performs a further operation on said workpiece.
3. The method set forth in claim 1 including moving said workpiece to a further station,
   moving a tool support having a locator and another tool thereon into said workpiece,
   causing fluid under pressure to flow between the surfaces of the locator and said second bore to maintain said tool support in accurate spaced relation to said workpiece while said other tool is performing an operation on said first bore.
4. The method set forth in claim 1 including moving the workpiece to a further station,
   bringing a gauge having a locator into position adjacent said workpiece,
   and causing fluid to flow between the surfaces of the locator and one of said bores while the gauge is gauging the other of said bores.
5. The method which comprises the steps of:
   supporting a workpiece having axially spaced concentric rough bores at a station,
   finish boring the axially innermost of said pair of bores at a first station,
   thereafter moving a tool support having a locator therein and a tool thereon for finishing the other of said bores into said workpiece,
   and providing fluid under pressure between the surfaces of the locator and the first bore to locate said tool support while said tool is operated on said second bore.
6. The method set forth in claim 5 including the steps of moving a tool support having a locator and another tool into said workpiece,
   causing fluid to flow between the surfaces of said locator and said first bore while said other tool performs a further operation on said second bore.
7. The method set forth in claim 5 including moving a tool support having a locator and another tool thereon to said workpiece,
   causing fluid under pressure to flow between the surfaces of the locator and said second bore to maintain said tool support in accurate spaced relation to said workpiece while said other tool is performing an operation on said first bore.
8. The method set forth in claim 5 including bringing a gauge having a locator into position adjacent said workpiece,
   and causing fluid to flow between the surfaces of the locator and one of said bores while the gauge is gauging the other of said bores.
9. An apparatus for boring workpieces having concentric axially related rough bores which comprises:
   means for moving said workpiece through a plurality of stations,
   means at a first station for finishing the axially innermost bore,
   means at a second station comprising a first tool support,
   means for moving said tool support axially into the workpiece,
   said tool support having locator means thereon,
   said locator means having axially spaced circumferentially located pressure pads therein,
   a restrictor associated with each said pressure pad,
   and means for supplying fluid under pressure to each said restrictor whereby fluid will flow under pressure from said pressure pads between the surfaces of said locator means and said first bore,
   and a tool on said tool support for accurately finishing said second bore while said tool support is located with respect to the workpiece by said locator means.
10. The combination set forth in claim 9 wherein said means for supporting said tool support for movement toward and away from the workpiece comprises a slide, a base,
   said slide and base having complementary surfaces,
   and a plurality of longitudinally spaced pressure pads in said surfaces,
   a restrictor associated with each said pressure pad, and means for supplying fluid under pressure to each said restrictor.

11. The combination set forth in claim 9 wherein said tool support is rotatably mounted and includes a housing,
a spindle supporting said locator means and said tool,
said housing and said spindle having complementary axially and radially extending surfaces,
circumferentially spaced pressure pads in said surfaces of one of said spindle and said housing,
a restrictor associated with each said pressure pad,
and means for supplying fluid under pressure to said restrictors.

12. The combination set forth in claim 9 including a second tool support at a third stations,
said second tool support including a second tool and locator means for extending into one of said bores,
said last mentioned locator means having at least one set of circumferentially spaced pressure pads therein,
a restrictor associated with each said pressure pad,
means for supplying fluid under pressure to said restrictors whereby said locator means will locate said workpiece and, in turn, said second tool relative thereto so that the second tool can perform an additional function on the workpiece.

13. The combination set forth in claim 9 including another tool support at a further station,
said last mentioned tool support having locator means thereon with a surface generally complementary to the surface of said second bore,
a plurality of circumferentially spaced pressure pads in said last-mentioned surface,
a restrictor associated with each pressure pad,
and means for supplying fluid under pressure to said restrictors,
said last mentioned tool support including a tool adapted to perform a further function on said first bore while said locator means thereon is locating the tool support with respect to the workpiece.

14. The combination set forth in claim 9 including a further station,
means at said further station including a gauge movable toward and away from the workpiece,
said gauge having locator means thereon with a surface complementary to one of said bores,
said surface having circumferentially spaced pressure pads therein,
a restrictor associated with each said pressure pad,
and means for supplying fluid under pressure to each said restrictor whereby said locator means locates said gauge with respect to one of said bores of said workpiece so that the gauge can be utilized to gauge the other of said bores.

15. An apparatus for boring workpieces having concentric axially related rough bores which comprises:
means for finishing the axially innermost bore,
means comprising a tool support,
means for moving said tool support axially into the workpiece,
said tool support having locator means thereon,
said locator means having axially spaced circumferentially located pressure pads therein,
a restrictor associated with each said pressure pad,
and means for supplying fluid under pressure to each said restrictor whereby fluid will flow under pressure from said pressure pads between the surfaces of said locator means and said first bore,
and a tool on said tool support for accurately finishing said second bore while said tool support is located with respect to the workpiece by said locator means.

16. The combination set forth in claim 15 wherein said means for supporting said tool support for movement toward and away from the workpiece comprises a slide,
a base,
said slide and base having complementary surfaces,
and a plurality of longitudinally spaced pressure pads in said surfaces,
a restrictor associated with each said pressure pad,
and means for supplying fluid under pressure to each said restrictor.

17. The combination set forth in claim 15 wherein said tool support is rotatably mounted and includes a housing,
a spindle supporting said locator and said tool,
said housing and said spindle having complementary axially and radially extending surfaces,
circumferentially spaced pressure pads in said surfaces,
a restrictor associated with each said pressure pad,
and means for supplying fluid under pressure to said restrictors.

18. An apparatus for performing a work operation on a workpiece having concentric axially related bores which comprises means comprising a tool support,
means for moving said tool support axially into the workpiece,
said tool support having locator means thereon for extending into one of said bores,
said locator having axially spaced circumferentially located pressure pads therein,
a restrictor associated with each said pressure pad,
and means for supplying fluid under pressure to each said restrictor whereby fluid will flow under pressure from said pressure pads between the surfaces of said locator and one said bore,
means for supplying fluid under pressure to said restrictors whereby said locator means will locate said workpiece and, in turn, said tool relative thereto so that the the tool can perform a work operation on the workpiece.

19. The combination set forth in claim 18 wherein said means for supporting said tool support for movement toward and away from the workpiece comprises a slide,
a base,
said slide and base having complementary surfaces,
and a plurality of longitudinally spaced pressure pads in said surfaces,
a restrictor associated with each said pressure pad,
and means for supplying fluid under pressure to each said restrictor.

20. The combination set forth in claim 18 wherein said tool support is rotatably mounted and includes a housing,
a spindle supporting said locator and said tool,
said housing and said spindle having complementary axially and radially extending surfaces,
circumferentially spaced pressure pads in said surfaces,
a restrictor associated with each said pressure pad,
and means for supplying fluid under pressure to said restrictors.

21. The method which comprises the steps of:
holding a workpiece having axially spaced concentric finished bores through successive stations,
moving a tool support having a locator therein and a tool thereon into said workpiece,
providing fluid under pressure between the surfaces of the locator and one said bore to locate said tool support while said tool is operated on said workpiece.

References Cited

UNITED STATES PATENTS

| 3,280,659 | 10/1966 | Allen | 77—1 |
| 3,457,810 | 7/1969 | Lewis et al. | 77—1 |

GERALD A. DOST, Primary Examiner

U.S. Cl. X.R.

77—56; 269—87.3